No. 782,595. PATENTED FEB. 14, 1905.
W. J. BULGER, Jr.
HOSE COUPLING.
APPLICATION FILED MAY 12, 1904.
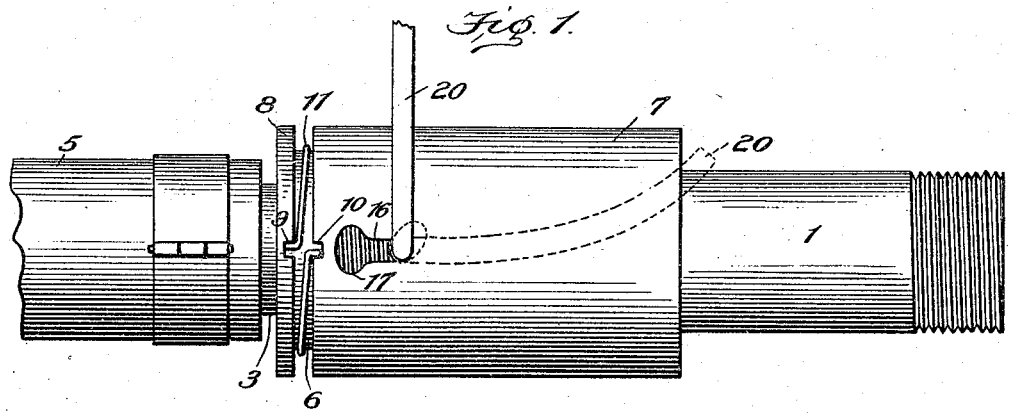
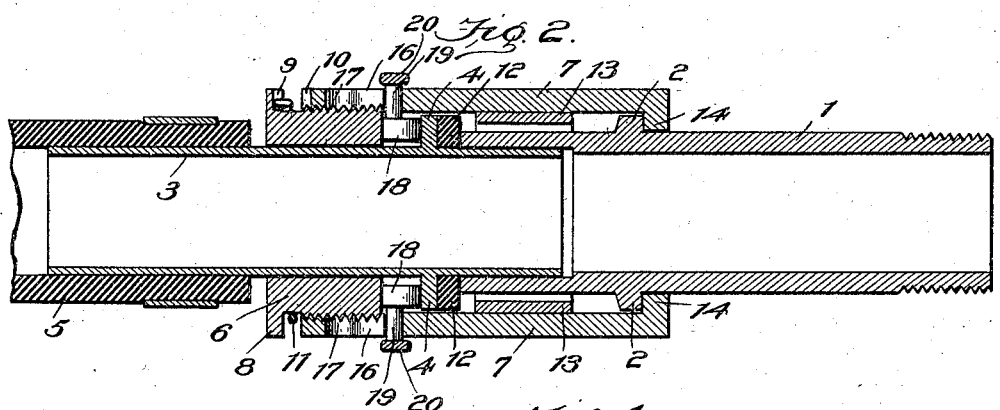
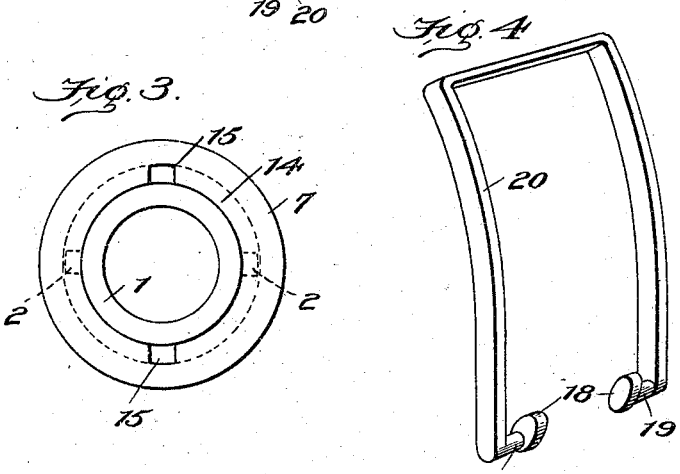
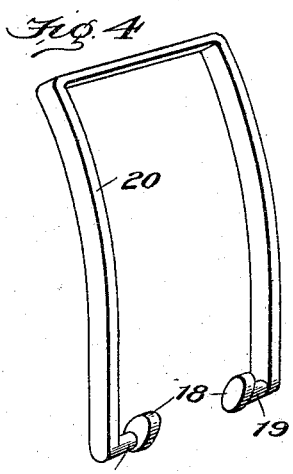
Witnesses
Karl Locke
A. Kaufman
Inventor
William J. Bulger Jr.
By A. E. Glanok
Attorney No. 782,595. Patented February 14, 1905.

UNITED STATES PATENT OFFICE.

WILLIAM JAMES BULGER, JR., OF GOUVERNEUR, NEW YORK.

HOSE-COUPLING.

SPECIFICATION forming part of Letters Patent No. 782,595, dated February 14, 1905.

Application filed May 12, 1904. Serial No. 207,635.

*To all whom it may concern:*

Be it known that I, WILLIAM JAMES BULGER, Jr., a citizen of the United States, residing at Gouverneur, in the county of St. Lawrence and State of New York, have invented new and useful Improvements in Hose-Couplings, of which the following is a specification.

This invention has relation to hose-couplings; and it consists in the novel construction and arrangements of its parts, as hereinafter shown and described.

The object of the invention is to provide a simple and effective means for joining two sections of hose together or a section of hose to a plug.

The coupling consists of two members, the end of one of which is adapted to slip in the end of the other. The male member is provided with an exterior flange, against which is located a gasket which is adapted to engage the end of the female member. The female member is provided with exterior lugs. A sleeve is located upon the male member and is provided at one end with an adjustable screw-threaded plug and at its other end with a flange having recesses adapted to permit the entrance of the lugs of the female member behind said flange. The said sleeve is provided with lever-operated eccentrics which are adapted to engage the flange of the male member and impinge the gasket between said flange and the end of the female member.

In the accompanying drawings, Figure 1 is a side elevation of the coupling. Fig. 2 is a horizontal sectional view of the same. Fig. 3 is an end view of the sleeve, and Fig. 4 is a perspective view of the lever and eccentrics.

The female member 1 is provided with the exteriorly-located lugs 2 2. The said member 1 may be connected to the end of a section of hose or to a plug. The male member 3 is provided with the exteriorly-located flange 4. The inner end of the member 3 is adapted to slip in the inner end of the member 1. The end of the hose-section 5 is attached to the outer end of the section 3. The plug 6 surrounds the section 3 and is screw-threaded into the sleeve 7. Said plug is provided with the flange 8, in which is located a notch 9. The end of the sleeve 7 is provided with a similar notch 10. The spring 11 surrounds the plug 6 and is provided with bent ends adapted to enter the notches 9 and 10. Thus the said plug 6 may be locked into position with relation to the sleeve 7; but by removing the spring 11 the said plug may be turned and adjusted back or forth in the end of the sleeve 7. The gasket 12 surrounds the member 3 and bears against the flange 4 and the inner end of the member 1. The annulus 13 is located within the sleeve 7 for the purpose of keeping the gasket 12 in its proper position when the members 1 and 3 are uncoupled. The other end of the sleeve 7 is provided with an inwardly-extending flange 14, which in turn is provided with the recesses 15, which are of sufficient size to permit the lugs 2 2 to pass therethrough and slip behind said flange. The sides of the sleeve 7 are provided with the elongated openings 16, having the enlarged portions 17 located at their rear ends. Through the said enlargements 17 the eccentrics 18 are passed, and the shank 19 thereof may slip into the openings 16. The said shanks 19 are connected together by the lever 20.

To couple the members 1 and 2, the lever 20 is elevated in the position as shown in heavy lines in Fig. 1. The inner end of the member 1 is passed through the inner end of the sleeve 7, and the inner end of the member 3 is slipped into the inner end of the member 1. The sleeve 7 is then given a quarter-turn, which brings the lugs 2 2 behind the flange 14. The lever 20 is then forced down into the position as shown by the dotted lines in Fig. 1. This movement of the lever causes the eccentrics 18 to describe a partial rotation. The said eccentrics bearing against the flange 4 force the gasket 12 against the end of the member 1 and the coupling is effected. To uncouple the members, the operation above described is reversed.

The object of making the plug 6 adjustable with relation to the sleeve 7 is to compensate for the gaskets 12 of different thicknesses.

Having described my invention, what I claim as new, and desire to secure by Letters Patent, is—

1. A coupling consisting of male and female members, an exterior flange located on one said member, exterior lugs located upon the other said member, a gasket located between said flange and the end of one of the members, a sleeve attached to one member and having a recessed flange adapted to pass beyond the lugs of the other member, lever-operated eccentrics attached to said sleeve and adapted to engage the flange of the flanged member on the side thereof opposite the gasket.

2. A coupling consisting of male and female members, an exterior flange located on one said member, exterior lugs located upon the other member, a gasket located between said flange and the end of one of the members, a sleeve attached to one member and having a recessed flange adapted to pass beyond the lugs of the other member, an adjustable plug located in said sleeve, lever-operated eccentrics attached to said sleeve and operating between said plug and the flange of the flanged member.

3. A coupling consisting of male and female members, an exterior flange located on one member, exterior lugs located upon the other member, a gasket located between said flange and the end of one of the members, a sleeve attached to one member and having a recessed flange adapted to pass beyond the lugs of the other member, an adjustable plug located in said sleeve, a means for locking said plug in position with relation to said sleeve, lever-operated eccentrics attached to said sleeve and operating between said plug and the flange of the flanged member.

4. A coupling consisting of male and female members, an exterior flange located on one member, exterior lugs located upon the other member, a gasket located between said flange and the end of one of the other members, a sleeve attached to one member and having a recessed flange adapted to pass beyond the lugs of the other member, said sleeve having an abutment, said sleeve having side openings with enlargements, eccentrics having shanks passing through said openings, a lever connecting said shanks together, said eccentrics operating between the flange of the flanged member and the abutment of the sleeve.

In testimony whereof I have signed my name to this specification in the presence of two subscribing witnesses.

WILLIAM JAMES BULGER, Jr.

Witnesses:
BURT ORRIN KINNEY,
WILLIAM BULGER, Sr.